Feb. 7, 1967 F. L. RAY 3,302,727
ONION TOPPER
Filed Sept. 2, 1964 3 Sheets-Sheet 1

INVENTOR.
FRANK L. RAY
BY
Townsend and Townsend
ATTORNEYS

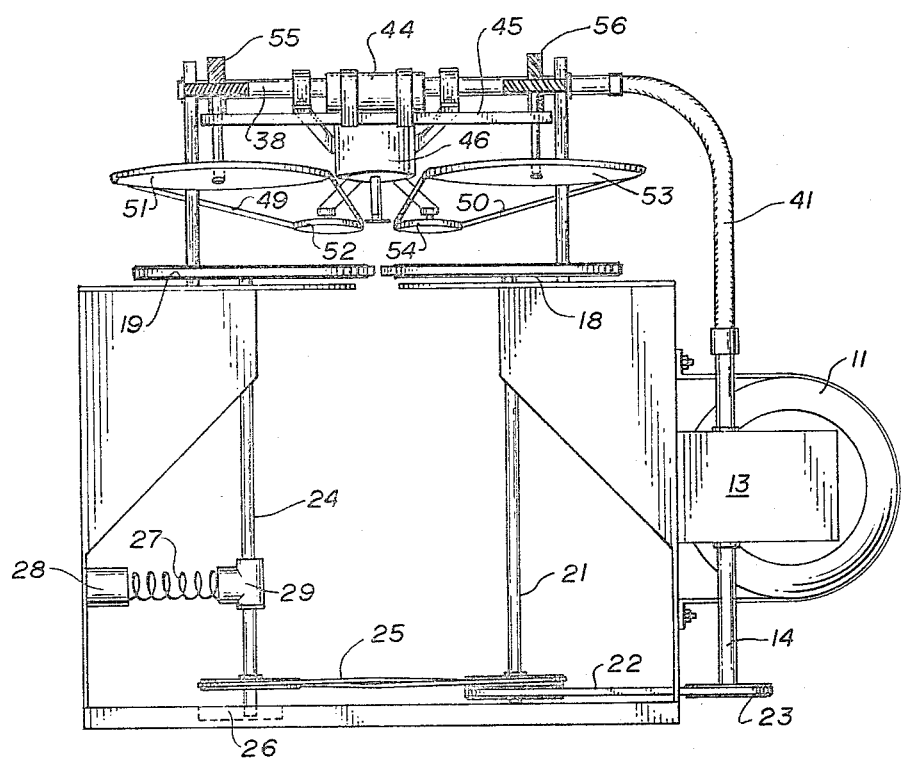
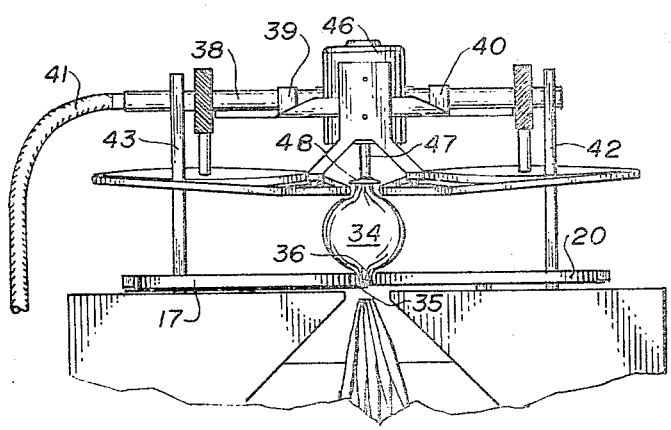

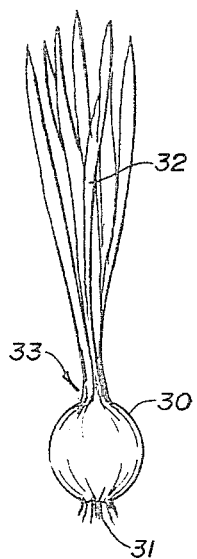
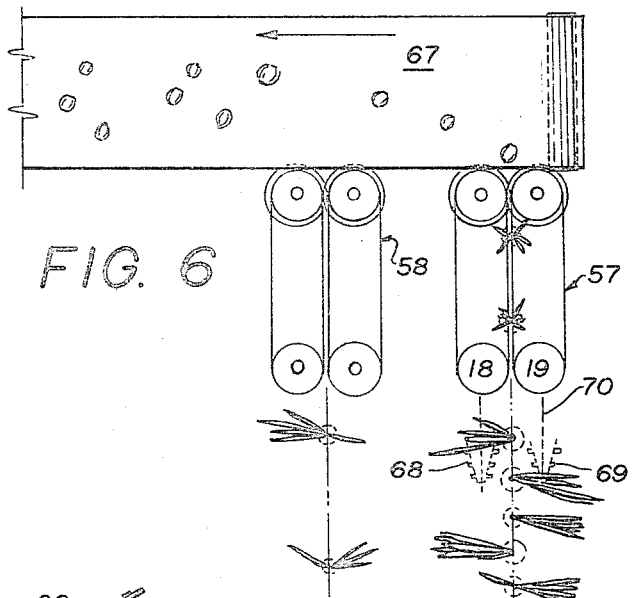
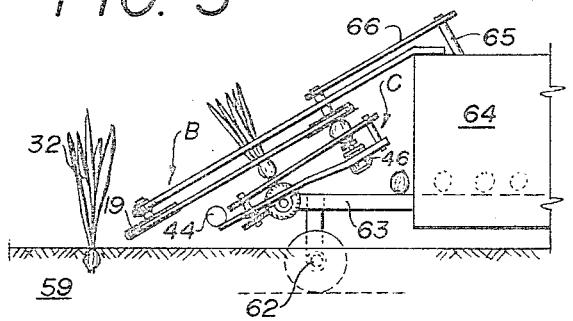
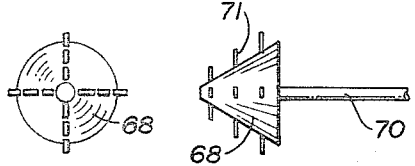
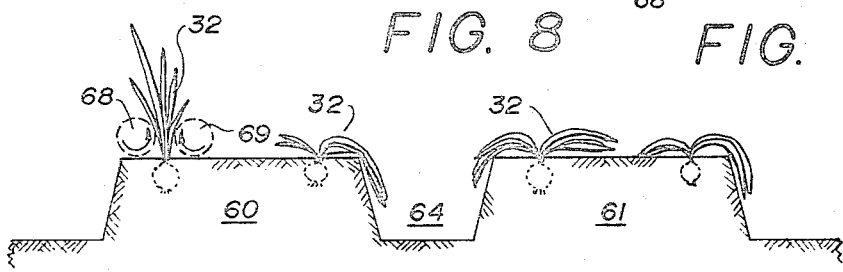
INVENTOR.
FRANK L. RAY

United States Patent Office 3,302,727
Patented Feb. 7, 1967

3,302,727
ONION TOPPER
Frank L. Ray, P.O. Box 1275, Stockton, Calif. 95201
Filed Sept. 2, 1964, Ser. No. 393,881
13 Claims. (Cl. 171—61)

This invention relates to a machine for processing onions to remove the leaves and roots from the onion bodies.

At the present time, soft, fresh onions—such as the Stockton yellow, which is a mild, sweet, tender type onion—are processed by hand labor after harvest to remove the leaves and roots. This operation is referred to as "topping" and this term has such a connotation as used throughout this specification and claims. Hand topping has obvious disadvantages including both cost and the undue length of time necessary to process a large quantity of onions. Even at that hand labor might still have been a satisfactory way of topping the onions. However, in recent times it is becoming increasingly difficult to find sufficient labor to do the job. As a result the grower cannot always depend upon harvesting his entire crop when it is ripe for harvest. Further, what labor there is available is unskilled and uninterested in doing an efficient job. A fair proportion of the onions that are hand topped with this labor are non-uniform and many are damaged to the extent of being unmarketable.

Mechanized toppers now in use operate on the principle of pulling the leaves from the onion rather than cleanly cutting them off. This results in a certain amount of damage to the onion body. The pulling operation can be tolerated on hard varieties of onions such as the Fiesta variety. However, the damage to the soft type of onion from pulling is too severe to be feasible as an approach to topping. Consequently, there is no useable topper on the market for soft onions despite the crying need for such apparatus. Efforts to date have all been in the direction of large and expensive machinery and none of these has as yet been perfected so as to reach the market.

The present invention provides a machine that cleanly cuts both roots and leaves from the onion body without pulling these portions from the body and without any damage to the onion regardless of whether the onion is of the soft tender type or not. At the same time the machine is of simple and small design and is capable of being manufactured very inexpensively. In a preferred embodiment of the invention the machine can be used in a mobile form in the field as part of a combination of equipment which serves to actually pull the onion from the seed bed, top the onion, and deposit it in a place for further handling and shipping.

The heart of the invention is in the topping mechanism itself which generally involves the following parts and steps of operation. The onion containing both roots and leaves is fed into a conveyor. The conveyor grips the onion by the leaves in the vicinity of the neck of the onion and holds the body and root in a generally upright position while it is being moved along on the conveyor. At the discharge end of the conveyor cutting blades sever the leaves from the onion.

At the same time the roots are removed by another cutting mechanism that is mounted on an assembly which adapts for the varying sizes of the onions being processed and moved by the conveyor so that the roots are uniformly cut down to the same length. In short, the root cutting is accomplished by pivotally mounting an assembly over the main conveyor and causing the assembly to pivot in response to the onion body size. The pivot motion is caused by a portion of the assembly which rides on the onion body. As an onion body moves through the conveyor it causes the assembly to pivot in direct proportion to its size. The root cutting blades are mounted on this pivoting assembly. As a result the cutting blades are moved in proportion to the onion body size and are always at the right position to cut the roots at the uniformly desired point.

Other aspects of the invention will be apparent from a reading of the following detailed description in conjunction with the drawings.

In the accompanying drawings:

FIG. 3 is a front end elevation of the apparatus of FIG. 1.

FIG. 4 shows a partial rear end elevation of the apparatus of FIG. 1 on the vicinity of the discharge end of the two conveyors and illustrating the severance of the leaves and the roots from an onion being processed.

FIG. 5 is a side elevational view of a typical onion showing the body, leaves and roots.

FIG. 6 is a schematic representation of a mobile unit employing the topping apparatus of FIG. 1 in combination with apparatus for removing onions directly from the seed beds and associated conveyors.

FIG. 7 is a side elevational view of a portion of the apparatus of FIG. 6 showing how the topping apparatus of FIG. 1 is positioned so as to be useful in removing the onions from the seed beds.

FIG. 8 shows an end elevational view of the apparatus used as part of the combination of FIG. 6 for purposes of causing the onion leaves to be stood upright.

FIG. 9 shows a side elevational view of the apparatus of FIG. 8.

FIG. 10 is a schematic side sectional view of a pair of seed beds showing both the normal growing position of onions and leaves and the manner of causing the leaves to be stood upright by the device of FIG. 8.

Figure 1:
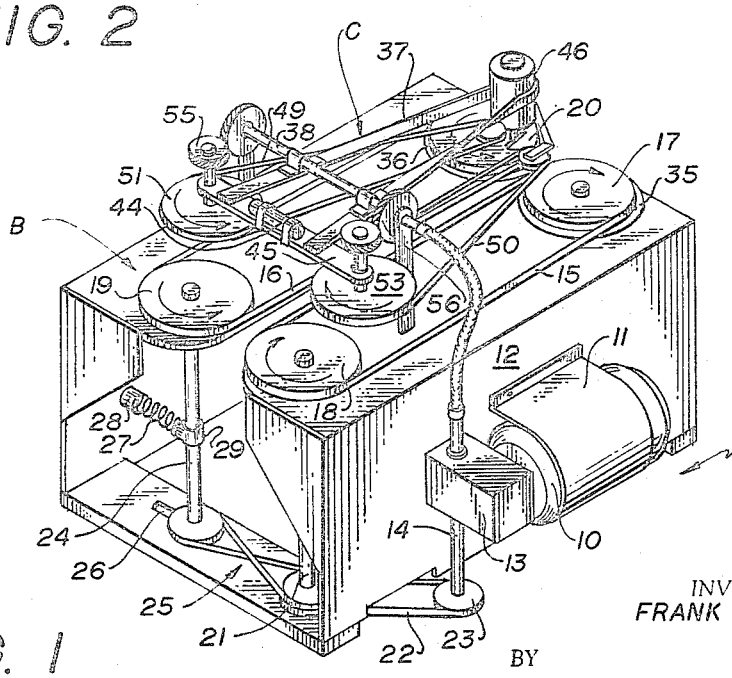
FIG. 1 is a perspective view of the topping portion of the apparatus.

More specifically with respect to the drawings, FIG. 1 in particular, the topping portion of the apparatus is shown in overall view. This apparatus may be considered to consist of three major components including a supporting frame and drive train shown generally at A, a first or base conveyor and leaf cutting assembly B, and an overhead root cutting assembly C. Taking these parts in order, A includes a power supply such as a motor 10 mounted by means of a bracket 11 on frame 12. Motor 10 supplies power through a suitable gear box 13 and drive shaft 14 to the conveyors of components B and C to be described hereinafter.

Component B includes a first or base conveyor formed from a pair of endless belts 15 and 16. Belt 15 is driven on pulleys 17 and 18 in the direction of the arrows shown thereon. Belt 16 is driven on pulleys 19 and 20, in the direction of the arrows shown thereon. Power is supplied to pulley 18 through shaft 21 by way of belt 22 from pulley 23 which is driven by shaft 14. Pulley 19 is similarly powered through shaft 24 which derives power from belt 22. Pulleys 18 and 19 are driven in opposite directions as illustrated by a convenient expedient such as crossing belt 22 at 25.

In the preferred embodiment belt 16 and its associated pulleys and shafts are designed so that belt 16 is urged in the direction of belt 15 to close the space between belts 15 and 16. This may be accomplished by mounting the shafts upon which pulleys 19 and 20 rotate in slots as shown at 26 and by applying force on the shafts. The force may be applied by a spring 27 that is fixed to frame 12 by bracket 28 and joined to shaft 24 by means of a sleeve 29 within which shaft 24 rotates. A similar structure is found in connection with the shaft upon which pulley 20 is mounted and rotates although not shown in the drawings.

To best understand the operation of this device the major parts of an onion are illustrated at FIG. 5. At that point the onion pictured may be viewed as comprising a body portion 30, roots 31 at one end thereof and leaves 32 at the opposite end thereof. Leaves 32 are joined to body 30 at 33, this area 33 being referred to generally as the neck of the onion.

Figure 2:
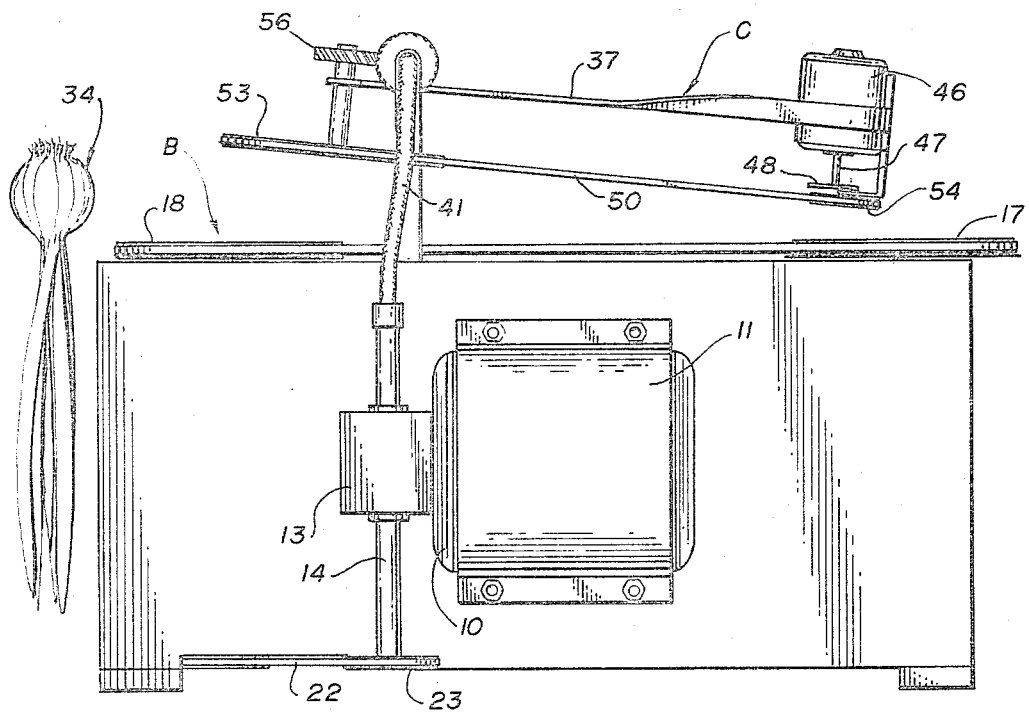
FIG. 2 is a side elevation of the apparatus of FIG. 1 showing an onion about to enter the conveyor thereof.

Turning now to FIG. 2, an onion 34 is fed into conveyor B at the entrance end at which time the neck of the onion is engaged and gripped between belts 15 and 16 in the vicinity of pulleys 18 and 19. The thickness of the neck of onion 34 urges belt 16 and its component parts away from belt 15 due to the resilient movable mounting thereof described above. This results in a snug slip-free fit of onion 34 on conveyor B and aids in maintaining the onions in the desired upright position.

As conveyor B is driven in the direction of the arrows, onion 34 is moved towards the opposite end of the conveyor until reaching the position shown in FIG. 4 in the vicinity of pulleys 17 and 20. At this point the leaves are cut and severed from onion 34 by overlapping knife edges 35 and 36. Knife edge 35 is formed from a protruding lower lip on pulley 17 whose outer edge has been suitably honed. Similarly, knife 36 is formed from a protruding lower lip on the bottom of pulley 20. As pulleys 17 and 20 are rotatably driven an onion 34 is passed therebetween. The leaves are severed as shown in FIG. 4.

The roots on the onion at the same time are cut by the overhead root cutting assembly C. Assembly C includes a frame 37 and associated cross members and brackets as most easily seen in FIG. 1. Frame 37 is depended from a transverse shaft 38 by hangers 39 and 40. Shaft 38 is rotatably mounted on frame 12 and is journalled within upright support arms 42 and 43. Shaft 38 is powered for rotation from shaft 14 through flexible shaft 41. Frame 37, and associated parts, is pivotable about shaft 38 independent of the rotation of shaft 38, shaft 38 turning freely in hangers 39 and 40.

The balance of frame 37 is adjustable by means of weight 44 which is secured to cross member 45 of frame 37. In the embodiment shown in FIGS. 1–4 the balance is adjusted through the selection of a suitable weight 44 so that frame 37 is pivoted in the position shown in FIG. 2 in the absence of an onion being processed by the apparatus.

A motor 46 is linked to drive shaft 47 which in turn rotates knife blade 48 which depends from the end thereof. With the balance as shown in FIG. 2 the normal position of the unit is to be pivoted so that knife blade 48 is at its closest position to conveyor belts 15 and 16 in the absence of an onion being processed. Motor 46 is driven by any suitable means such as a source of electricity not shown in the case where motor 46 is an electric motor. It will be clear that other mechanisms for driving knife 48 and shaft 47 could be utilized such as a remote power supply that is linked to shaft 47 through a flexible cable such as 41. In this case motor 46 could be eliminated from the top assembly entirely.

Root cutting assembly C also includes a conveyor comprising a pair of endless belts 49 and 50. Belt 49 is also driven by pulleys. It is looped around pulleys 51 and 52 while belt 50 is driven by pulleys 53 and 54. Power is supplied to pulleys 51 and 53 respectively through gear trains 55 and 56 respectively. Gear trains 55 and 56 are powered through shaft 38 by flexible shaft 41. Since both conveyor B and the conveyor portion of assembly C are driven from th same power supply, the selection of a suitable gear arrangement permits obtaining a uniform conveyor speed on both B and C that is independent of any possible fluctuations in motor performance. This is important in maintaining the onion in a generally upright position as will be discussed.

As shown most clearly in FIG. 3 with respect to the conveyor of assembly C, pulleys 51 and 53 are more widely spaced apart than pulleys 52 and 54. Consequently belts 49 and 50 are more widely spaced at the input end than at the exit end in the vicinity of knife 48. This arrangement to obtain a V-shaped spacial configuration serves to permit contact with an onion on conveyor B regardless of its position with respect to the vertical and generally causes shifting of the onion to the upright position by the time it reaches the end of the conveyor for root severance. It is also to be noted that the conveyor part of assembly C is staggered in relation to conveyor B so that the onion is first engaged by conveyor B before contact by the onion is made with the conveyor of assembly C. (See FIG. 2.)

Returning now to the description of the processing of the onion, it is moved along by conveyor B to the point of severance of the leaves as shown in FIG. 4. Assembly C is performing its function at the same time during this progress of onion 34 along conveyor B. The top of the onion body in the vicinity of the roots at some point contacts belts 49 and 50. If contact is made with only one of the belts 49 or 50 first because of a nonvertical position of the onion, progression further on into the V formed by belts 49 and 50 will serve to upright the onion as discussed above. At some point both belts 49 and 50 rest on the top of the onion and cooperate with conveyor B to move the onion along.

During the time of such contact, progression of the onion body begins to force belts 49 and 50 upwardly. This in turn causes the entire assembly C to be pivoted upwardly. The amount of upward pivotal movement of assembly C will thus be in direct proportion to the thickness or height of the onion body. When onion 34 reaches the point of leaf cutting shown in FIG. 4 assembly C has been pivoted so that knife 48 is in position to sever the roots of the onion. Since the pivotal movement is proportioned by the onion body size knife 48 is always the same distance over the top of the onion body regardless of body size. If the next onion being processed has a different body size, assembly C will be pivoted accordingly. In every case the roots will thus be uniformly cut at the same length from the onion body by the time the onion reaches the discharge end of the assembly.

FIGS. 6 through 10 illustrate how the apparatus of FIGS. 1–4 can be used in the field so as to pull onions directly from the seed beds, top them, and convey them for further handling. To accomplish this a plurality of topping units of the type illustrated in FIG. 1 and shown generally at 57 and 58 in FIG. 6 are mounted as shown in FIG. 7 and inclined with respect to the ground 59. The functional unit is suitably mounted on a vehicle such as a tractor or truck so that it can be moved over seed beds such as 60 and 61 in FIG. 10 within which a plurality of onions are growing. In this operation the topper is inverted as shown most clearly in FIG. 7 with conveyor assembly B being positioned over the root cutting assembly C. In this type of an operation the balance of the assembly C is reversed so that the root cutting blade 48 is caused to pivot upwardly towards conveyor B in the absence of an onion being processed. This is adjusted through a balance of the motor 46 and weight 44 and choice of pivot point, as well as by the choice of the frame construction selected for assembly C.

In this embodiment the topping unit is positioned and maintained a suitably distance above the ground 59 with a gauge wheel 62 depended from frame 63. Gauge wheel 62 suitably rides in the furrows between the seed beds such as furrow 64 between seed bed 60 and 61 in FIG. 10.

Conveyor B and assembly C are supported on the mobile platform formed by frame 63 and the propelling unit selected, a portion of which is shown at 64. Power may be derived from a motor mounted on propelling unit 64 and is fed to the conveyors and cutting surfaces through a shaft 65 and a drive belt 66.

In employing the mobile embodiment, conveyor B is brought into position so that the leaves 32 of an onion are engaged between pulleys 18 and 19 at the entrance end of conveyor B. When leaves 32 are gripped between belts 15 and 16 as previously discussed the onion is pulled directly from the ground if the ground has been previously loosened sufficiently if required. The onion is then processed through the machinery and topped in the manner described previously following which it is moved along the conveyor as shown in FIG. 6. Topped onions may then be deposited on a belt conveyor 67 for example for transport to a suitable storage area on propelling unit 64 or elsewhere as desired.

In order for conveyor B to grab leaves 32 between the belts 15 and 16, leaves 32 must be in a generally upstanding position. However, in the normal course of events leaves 32 are bent over and generally follow the contour of the seed bed 61 as shown in FIG. 10. To remedy this situation a pair of rotating lifting cones 68 and 69 are utilized on either side of the onion leaves 32. A typical cone 68 is shown in FIGS. 8 and 9. Cone 68 is mounted on a shaft 70. Shaft 70 is depended beneath conveyor B of topping unit 57 and is rotated from a power source not shown on the propelling unit 64. Cone 69 is similarly mounted and rotated.

Cone 68 (cone 69 being the same) contains a plurality of lifting fingers 71 extending outwardly from the cone in a direction generally transverse to the axis of shaft 70. If cones 68 and 69 are rotated in the direction of the arrows shown in FIG. 10, lifting fingers 71 cause leaves 32 to be stood generally upright and conveyor B can be moved in directly behind the rotating cones to grip leaves 32 between its belts.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An onion topping machine comprising: frame means, conveyor means mounted on said frame means adapted to transport an onion in a generally upright position, first cutting means associated with said conveyor means to cut leaves from one end of an onion as the onion is moved along by said conveyor means, and a root cutting assembly pivotally mounted on said frame means including second cutting means, said root cutting assembly being positioned so as to contact the body of an onion being transported by said conveyor means and be pivoted an amount directly proportional to the onion body size, said second cutting means being positioned to engage and sever roots only on the end of the onion body opposite the leaves after the root cutting assembly has been pivoted by the onion body and the onion advanced adjacent said second cutting means by said conveyor means.

2. An onion topping machine comprising: a frame, a first conveyor on said frame adapted to transport an onion in a generally upright position, first cutting means associated with said first conveyor to cut leaves from one end of the onion as the onion is moved along by said first conveyor, a root cutting assembly pivotally mounted on said frame generally parallel to said first conveyor, said root cutting assembly including a second conveyor adapted for cooperating with said first conveyor to move the onion and assist in maintaining the onion in a generally upright position, said second conveyor being positioned so that it contacts the body of the onion being transported and thereby causes the entire root cutting assembly to pivot an amount directly proportional to the onion body size, and second cutting means on said root cutting assembly positioned so as to be pivoted with the assembly to engage and sever roots only on the end of the onion body opposite the leaves as the onion is moved adjacent the location of the second cutting means.

3. An onion topping machine in accordance with claim 2 and including synchronization means for said first and second conveyors so that they can be operated at the same speed.

4. An onion topping machine in accordance with claim 2 and including balance means for said root cutting assembly to cause said assembly to pivot so that the second cutting means mounted thereon is moved closest to said first conveyor in the absence of an onion being processed.

5. An onion topping machine comprising: a frame, a first conveyor mounted on said frame formed from a pair of continuous belts on pulleys arranged to engage an onion between the belts in the vicinity of the juncture of the leaves and the onion body, first cutting means associated with said first conveyor for cutting the leaves from said onion body as the onion is moved along by the belts, a root cutting assembly pivotally mounted on said frame, said root cutting assembly including a second conveyor formed from a pair of spaced apart continuous belts on pulleys arranged so that the belts can engage and ride upon the root end of the onion body and maintain the onion in a generally upright position between the belts in cooperation with said first conveyor, second cutting means mounted on said root cutting assembly, said root cutting assembly being caused to pivot by said second pair of continuous belts riding on the onion body in response to the size of the onion body, said second cutting means pivoting with said root cutting assembly and being positioned thereon to engage and sever roots only on the onion body when the onion body is conveyed adjacent thereto.

6. An onion topping machine in accordance with claim 56 wherein said first cutting means comprises a sharpened lip on each of a pair of adjacent belt pulleys located at the discharge end of said first conveyor, said sharpened lips lying in different planes and overlapping.

7. An onion topping machine in accordance with claim 5 wherein said first cutting means comprises a sharpenable shaft having a blade on the end thereof depending from said root cutting assembly over said first conveyor adjacent the discharge end thereof.

8. An onion topping machine in accordance with claim 5 and including synchronization means for said first and second conveyors comprising a single power source geared and linked so as to drive both of said first and second conveyors.

9. An onion topping machine comprising: a frame, a first conveyor mounted on said frame including a pair of parallel continuous belts driven by pulleys, said belts being spaced apart to grip an onion by the neck between the belts, leaf cutting means associated with said first conveyor at the discharge end thereof to sever the leaves from the onion body, a root cutting assembly pivotally mounted on said frame generally parallel to said first conveyor, said root cutting assembly including a second conveyor, said second conveyor being off-set in relation to said first conveyor so that said first conveyor engages the onion before the onion is moved into position to be engaged by said second conveyor, said second conveyor comprising a pair of belts driven by pulleys to assist in supporting the onion in a generally upright position on said first conveyor and to assist in the transport thereof, the belts of said second conveyor being more widely spaced apart at the entrance to said second conveyor than at its discharge end, said root cutting assembly including balance means to cause the assembly to pivot towards said first conveyor in the absence of an onion being processed, the belts of said second conveyor adapted to ride on the end of the body of the onion in the vicinity of its roots, the onion body thereby causing said conveyor belts and in turn the entire root cutting assembly to be pivoted away from said first conveyor an amount directly proportional to the size of the onion body, and root cutting means depending from said root cutting assembly adjacent the discharge end of said second conveyor for engaging and severing roots only from the onion body.

10. An onion topping machine in accordance with claim 9 and including means to resiliently urge one belt towards the other belt of said first conveyor to enhance the grip on the onion neck by said first conveyor.

11. A mobile onion topping machine for use in removing onions from the ground and severing the roots and leaves therefrom comprising: means for standing the leaves on an onion upright while the onion is still embedded in the soil, frame means, conveyor means mounted on said frame means adapted to engage the upstanding leaves on said onion and pull the onion from the ground, first cutting means associated with said conveyor means to cut the leaves from one end of the onion as the onion is moved along by said conveyor means, a root cutting assemby pivotally mounted on said frame means including second cutting means, said root cutting assembly being positioned so as to contact the body of the onion being transported by said conveyor means and be pivoted an amount directly proportional to the onion body size, said second cutting means being positioned to engage and sever roots only on the end of the onion body opposite the leaves after the root cutting assembly has been pivoted by the onion body.

12. Mobile apparatus in accordance with claim 11 wherein said means for standing the onion leaves upright comprises a pair of parallel rotatable shafts, a conical member on the end of each of said shafts, and a plurality of lifting fingers extending outwardly from each of said conical members generally transverse to the axis of said shafts.

13. A mobile apparatus in accordance with claim 11 and including means for transporting the topped onion from said conveyor means to a storage area.

References Cited by the Examiner
UNITED STATES PATENTS

| | | | |
|---|---|---|---|
| 992,862 | 5/1911 | De Young | 171—38 |
| 2,294,348 | 8/1942 | Kolstad | 171—32 |
| 2,300,063 | 10/1942 | Romine | 171—29 X |
| 2,357,810 | 9/1944 | Christiansen | 171—36 |

ANTONIO F. GUIDA, *Acting Primary Examiner.*